United States Patent
Vavilala et al.

(10) Patent No.: US 11,948,274 B1
(45) Date of Patent: Apr. 2, 2024

(54) DEEP LEARNED SUPER RESOLUTION FOR FEATURE FILM PRODUCTION

(71) Applicant: Pixar, Emeryville, CA (US)

(72) Inventors: Vaibhav Vavilala, Emeryville, CA (US); Mark Meyer, San Francisco, CA (US)

(73) Assignee: PIXAR, Emeryville, CA (US)

( * ) Notice: Subject to any disclaimer, the term of this patent is extended or adjusted under 35 U.S.C. 154(b) by 179 days.

(21) Appl. No.: 17/569,399

(22) Filed: Jan. 5, 2022

Related U.S. Application Data

(60) Provisional application No. 63/134,074, filed on Jan. 5, 2021.

(51) Int. Cl.
| | |
|---|---|
| G06T 3/00 | (2006.01) |
| G06N 3/045 | (2023.01) |
| G06N 3/088 | (2023.01) |
| G06T 3/4046 | (2024.01) |
| G06T 3/4053 | (2024.01) |
| G06T 7/00 | (2017.01) |
| G06T 13/20 | (2011.01) |

(52) U.S. Cl.
CPC .......... *G06T 3/4053* (2013.01); *G06N 3/045* (2023.01); *G06N 3/088* (2013.01); *G06T 3/4046* (2013.01); *G06T 7/0002* (2013.01); *G06T 13/20* (2013.01); *G06T 2207/10024* (2013.01); *G06T 2207/20081* (2013.01); *G06T 2207/20084* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 10,467,729 B1 * | 11/2019 | Perera | G06T 3/4046 |
| 2018/0341836 A1 * | 11/2018 | Lim | G06F 18/2413 |
| 2019/0147321 A1 * | 5/2019 | Miyato | G06N 3/045 |
| | | | 382/157 |
| 2019/0251721 A1 * | 8/2019 | Hua | G06T 5/002 |

(Continued)

OTHER PUBLICATIONS

Gao et al., "Image super-resolution based on conditional generative adversarial network," IET Image Processing, Nov. 2020, 14(13):3006-3013 (Year: 2020).*

(Continued)

*Primary Examiner* — Martin Mushambo
(74) *Attorney, Agent, or Firm* — Kilpatrick Townsend & Stockton LLP

(57) ABSTRACT

A method performed by a computer is disclosed. The method comprises receiving color data for input pixels of an input image and an input set of features used to render the input image of a three-dimensional animation environment, wherein the input pixels are of a first resolution. The computer may then load into memory a generator of a generative adversarial network including a neural network used to scale the input image, the neural network trained using training data comprising color data of training input images and training output images and a training set of the features used to render the training input images. After the generator is loaded into memory, the computer may generate an output image having a second resolution that is different than the first resolution by passing the color data and the input set of features through the generator.

16 Claims, 12 Drawing Sheets

(56) References Cited

U.S. PATENT DOCUMENTS

| | | | | |
|---|---|---|---|---|
| 2019/0295302 | A1* | 9/2019 | Fu | G06V 10/82 |
| 2020/0211209 | A1* | 7/2020 | Liao | G06T 5/005 |
| 2021/0192801 | A1* | 6/2021 | Zeller | G06T 11/00 |
| 2021/0232803 | A1* | 7/2021 | Fu | G06N 3/047 |
| 2021/0303243 | A1* | 9/2021 | Li | G06V 10/454 |
| 2021/0303318 | A1* | 9/2021 | Raghavan | G06F 40/279 |
| 2021/0407051 | A1* | 12/2021 | Pardeshi | G06T 5/50 |
| 2022/0245765 | A1* | 8/2022 | Wang | G09G 5/005 |

OTHER PUBLICATIONS

Liu et al., "PSGAN: A Generative Adversarial Network for Remote Sensing Image Pan-Sharpening," IEEE Transactions on Geoscience and Remote Sensing, Mar. 2020, 14(8):15 pages (Year: 2020).*

Xintao Wang et al. "Enhanced Super-Resolution Generative Adversarial Networks", Sep. 2018. (Year: 2018).*

* cited by examiner

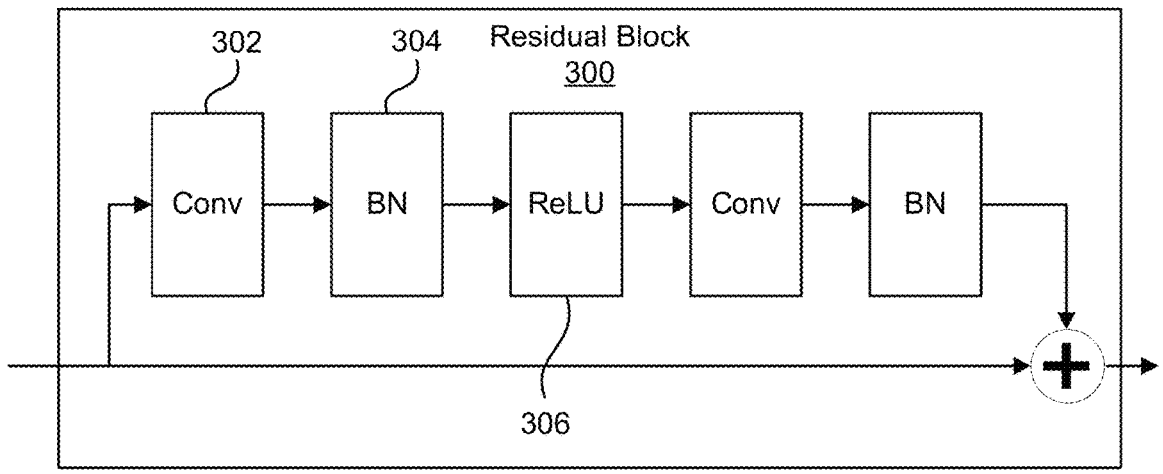
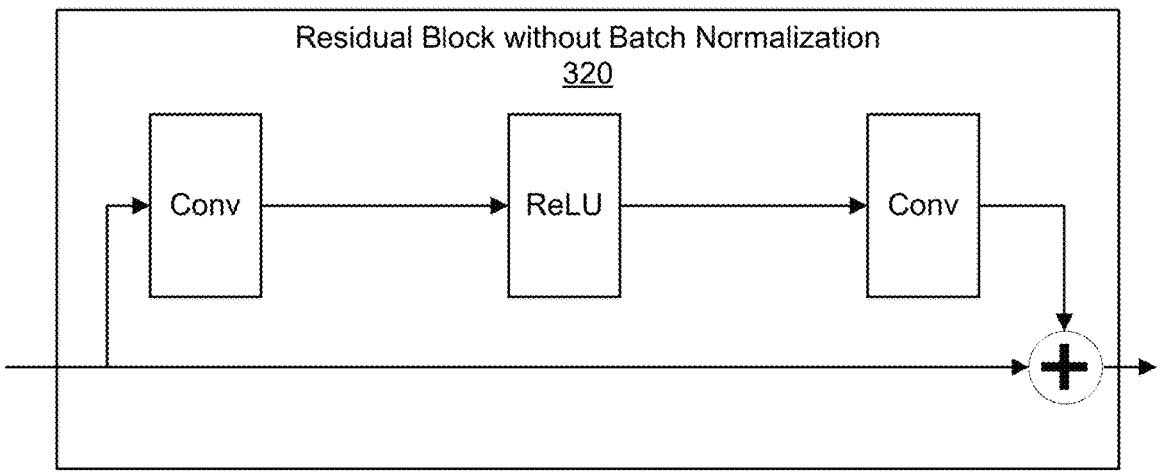
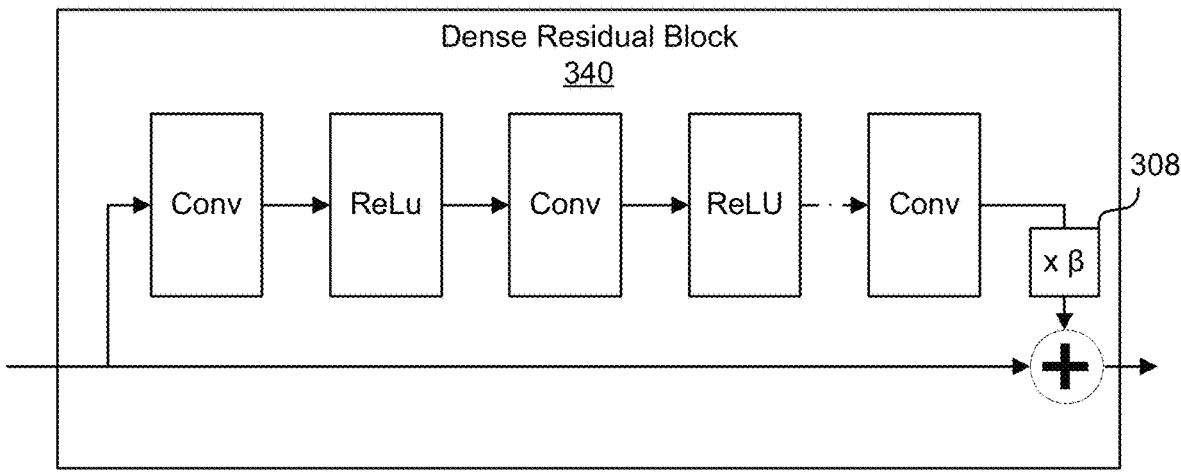
FIG. 3

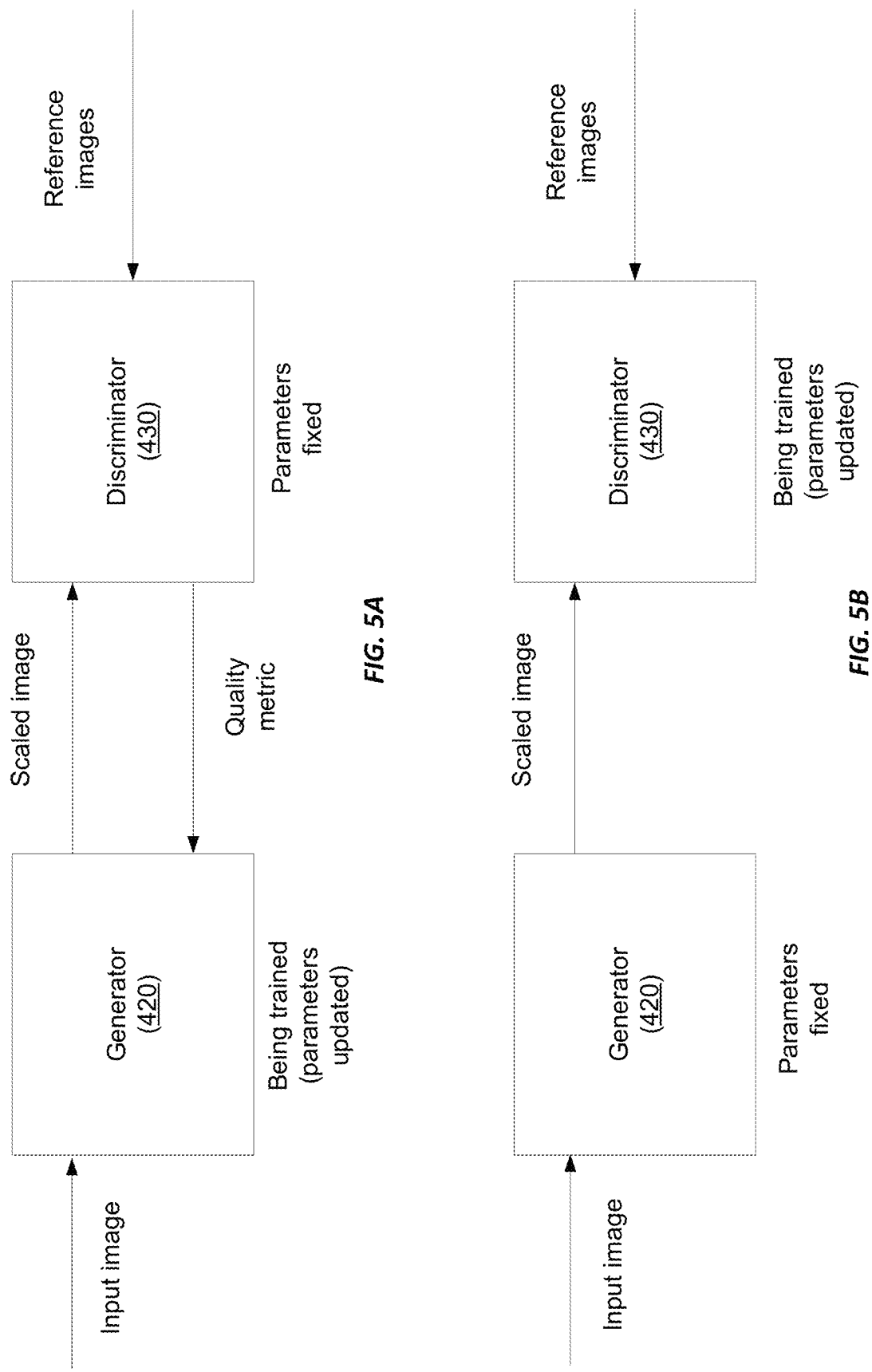

Receive color data for input pixels of an input image and an input set of features used to render the input image of a three-dimensional animation environment, and a reference image

Configuring a generative adversarial network comprising:

a generator comprising a first neural network having a first set of parameters, the generator configured to generate an output image having a different resolution;

a discriminator coupled to the generator, comprising a second neural network having a second set of parameters, the discriminator configured to:
  receive the reference image, and the output image generated by the generator;
  generate a quality metric based on a comparison of the output image with the reference image; and
  output the quality metric to the generator;

604

Train the generative adversarial network to obtain an optimized first set of parameters and an optimized second set of parameters
606

*FIG. 6*

*FIG. 8*

900 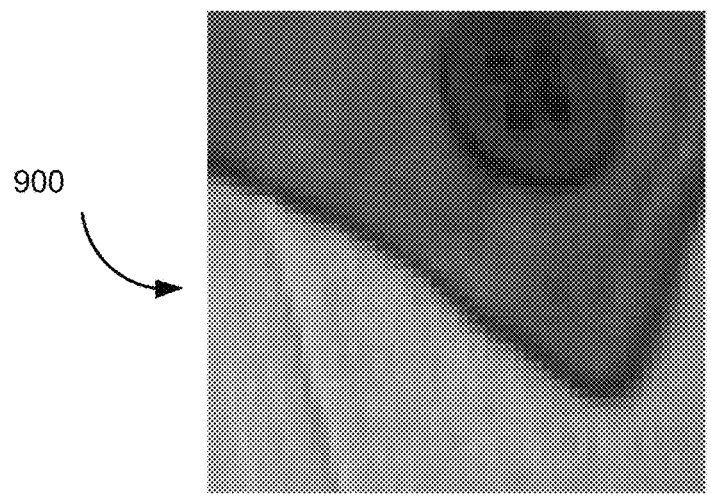
910 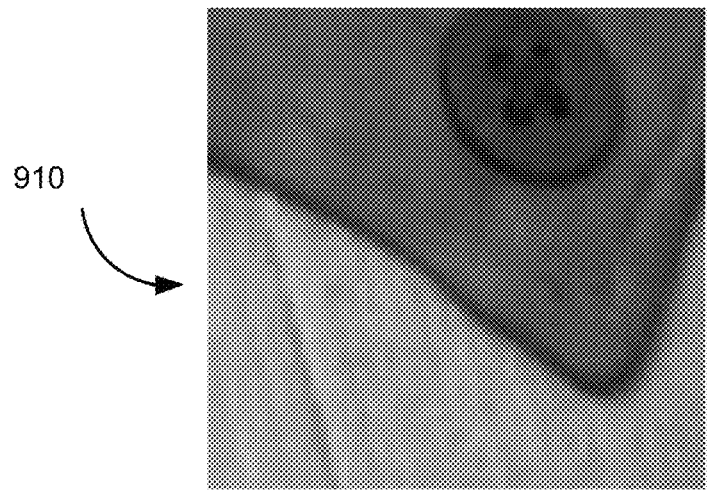
920 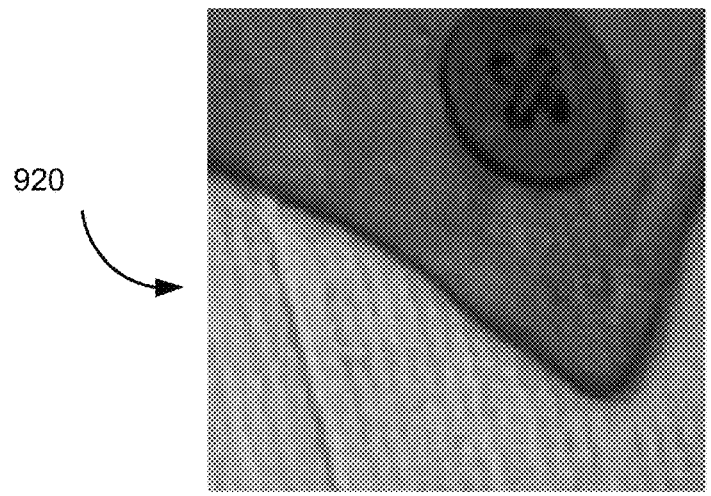
FIG. 9

DEEP LEARNED SUPER RESOLUTION FOR FEATURE FILM PRODUCTION

CROSS-REFERENCES TO RELATED APPLICATIONS

This application claims priority to U.S. Provisional Patent Application Ser. No. 62/134,074, filed Jan. 5, 2021, entitled "Deep Learned Super Resolution For Feature Film Production", which is herein incorporated by reference in its entirety and for all purposes.

BACKGROUND

Creating high resolution content is difficult due to the cost of photorealistic ray-traced rendering. Upscaling can be used to create high resolution images, which are otherwise costly or impossible to produce. Image upscaling techniques are commonly used to obtain a high resolution result from a low resolution rendered image. Several techniques are commonly used to upscale images, such as nearest-neighbor, bilinear, and bicubic interpolation. Such techniques often leave visual artifacts or miss key details and thus are not as accurate as desired.

BRIEF SUMMARY

Techniques to scale an image generated via 3D animation are disclosed. As an example, a method can comprise: receiving color data for input pixels of an input image and an input set of features used to render the input image of a three-dimensional animation environment, wherein the input pixels are of a first resolution; loading into memory of a generator of a generative adversarial network, wherein the generator comprises a neural network used to scale the input image, wherein the generator was trained using training data comprising color data of training input images and training output images and a training set of the features used to render the training input images; and generating an output image having a second resolution that is different than the first resolution by passing the color data and the input set of features through the generator.

As another example, a method can comprise: receiving color data for input pixels of an input image and an input set of features used to render the input image of a three-dimensional animation environment, and a reference image, wherein the input pixels are of a first resolution; configuring a generative adversarial network comprising: a generator comprising a first neural network having a first set of parameters, the generator configured to generate an output image having a second resolution that is different to the first resolution corresponding to the input image using the first set of parameters; and a discriminator coupled to the generator, comprising a second neural network having a second set of parameters, the discriminator configured to: receive the reference image and the output image generated by the generator; generate a quality metric based on a comparison of the output image with the reference image; and output the quality metric to the generator, wherein the generator is further configured to update the first set of parameters based on the quality metric and to produce an updated output image using the updated first set of parameters; and training the generative adversarial network to obtain an optimized first set of parameters and an optimized second set of parameters.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 3 illustrates exemplary blocks shown in FIG. 2 according to some embodiments of the present invention.

FIGS. 5A and 5B illustrate a system for training a scaler based on generative adversarial networks according to some embodiments of the present invention.

FIG. 6 is a flowchart illustrating a method of training a generative adversarial network according to some embodiments of the present invention.

FIG. 8 depicts images generated using a generative adversarial network according to some embodiments of the present invention.

FIG. 9 depicts other images generated using a generative adversarial network according to some embodiments of the present invention.

DETAILED DESCRIPTION

Figure 1:
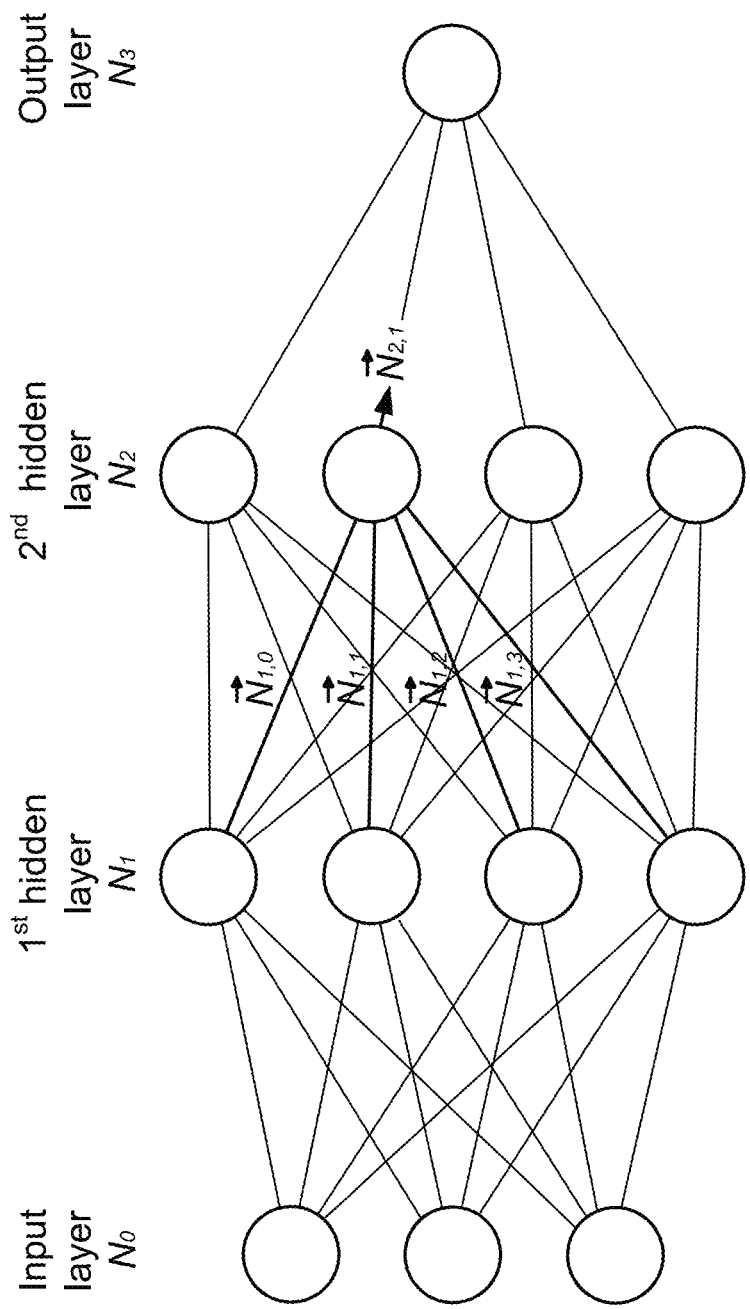
FIG. 1 illustrates an exemplary neural network according to some embodiments.

Computers may be used to create animations and imagery (e.g., computer-generated imagery or CGI). Two-dimensional (2D) or three-dimensional (3D) computer animations may combine the use of 2D and 3D models of objects, and the movement of one or more of the models. A process known as "rendering" may be used to generate the animations or images, which converts the mathematical description of objects into a rendered image in a three-dimensional animation environment. The mathematical description of objects may contain a set of features of the image (e.g., position data of the pixel, shading normal of the pixel, a depth of the pixel, an albedo of the pixel, a position value of the pixel, a motion vector of the pixel) that are used to render the image (e.g., rendering color data for pixels of an image). To create a visually appealing image, the objects may be rendered in high resolution. However, rendering of a high resolution image may be resource intensive, requiring computationally intensive rendering.

To reduce the cost of creating high resolution images, a first image may be rendered at a low resolution. The resolution of the first image may be increased using upscaling techniques, such as nearest-neighbor, bilinear, or bicubic interpolation, or other techniques such as Total Variational Inpainting. Deep learning methods can also be used to improve the detail and sharpness of upscaled images as compared to traditional upscaling algorithms. Such deep learning techniques have been applied to the color data that cameras provide. Deep learned upscaling in a production setting has allowed sharper and more detailed imagery to be produced as compared to previous methods. The quality of the deep learned upscaling is dependent on the size of its dataset, which can be expensive to generate at scale due to the large number of ray-traced pairs of rendered images used to train the upscaling model. In addition, deep convolutional neural networks have demonstrated greater upscaling quality by learning the low-resolution to high-resolution mapping from a high volume of data. One such example of a convolution neural network is a generative adversarial network. A generative adversarial network can upscale low-resolution images to produce high-resolution images with details and sharpness close to a rendered high-resolution image. Examples of such generative adversarial network may be super-resolution generative adversarial networks (SRGANs), enhanced super-resolution generative adversarial network (ESRGANs), etc. However, the generative adversarial network may require a large amount of training data to learn the upscaling mapping, and the data itself may be costly or time consuming to create.

For traditional camera images, it is difficult to generate training data, as it is very difficult to produce a low-resolution and high-resolution image pair (e.g., two different resolution cameras would need to take the exact same shot which is difficult). As producing a large enough amount of training data is difficult using cameras, some have used downscaling techniques to create a low-resolution image from a high-resolution image. Traditional downscaling techniques however do not create accurate low-resolution/high-resolution image pairs to properly train the generative adversarial network. In computer generated imagery, it is possible to render both a low-resolution image and a high-resolution image, however, as explained above, it may be cumbersome to perform the render of image pairs on the scale required to generate training data for the generative adversarial network to accurately learn the mapping.

Embodiments provide for a neural network that can be used to scale the resolution of images (e.g., downscale or upscale the resolution of images). The neural network may be a generative adversarial network that can take as input the color data of an image and a set of features used to render the image. A generator of the generative adversarial network may comprise residual blocks used to scale the input images, generating an output image at a second resolution. By using including the set of features used to render input images, the generative adversarial network can more accurately learn the mappings between resolutions. The generative adversarial network may first be trained using a first training data set to learn the high-to-low resolution mapping. The high-to-low resolution mapping may then be used to generate a second training data set, which is typically larger than the first training data set that is used to learn the low-to-high resolution mapping. Additionally, as the low-to-high resolution mapping may be learned by the generative adversarial network with a smaller rendering farm footprint as compared to traditional upscaling techniques.

I. Machine Learning and Neural Networks

A. Machine Learning

Machine learning may be used to automate model building. Two common approaches to machine learning are unsupervised learning, and supervised learning. In unsupervised learning, algorithms may take an input and be applied to unlabeled data to create a predictive model. In supervised machine learning, algorithms may take an input and be applied to labeled data to create a predictive model, where the algorithm learns from a training data set containing labeled input and output data.

B. Neural Networks

Neural networks are a class of models with a number of parameters that can capture patterns in data. A model function $f$ of a neural network is composed of atomic building blocks called "neurons" or nodes. A neuron $n_i$ has inputs $\vec{x}_i$ and a scalar output value $y_i$, and it computes the output as $$y_i = n_i(\vec{x}_i, \vec{w}_i) = \phi_i((\vec{x}_i \cdot \vec{w}_i)), \tag{8}$$

where $\vec{w}_i$ are the neuron's parameters and $\vec{x}_i$ is augmented with a constant feature. $\phi$ is a non-linear activation function that ensures a composition of several neurons can be non-linear. Activation functions can include hyperbolic tangent tanh(x), sigmoid function ($\phi_{sigmoid}(x) = (1+\exp(-x))^{-1}$, and the rectified linear unit (ReLU) $\phi_{ReLU}(x) = \max(x, 0)$.

A neural network is composed of layers of neurons. The input layer $N_0$ contains the model's input data $\vec{x}$, and the neurons in the output layer predict an output $\hat{\vec{y}}$. In a fully connected layer $N_k$, the inputs of a neuron are the outputs of all neurons in the previous layer $N_{k-1}$.

FIG. 1 illustrates an exemplary neural network, in which neurons are organized into layers. $\vec{N}_k$ denotes a vector containing the outputs of all neurons $n_i$ in a layer k>0. The input layer $\vec{N}_0$ contains the model's input features $\vec{x}$. The neurons in the output layer return the model prediction $\hat{\vec{y}}$. The outputs of the neurons in each layer k form the input of layer k+1.

The activity of a layer $N_i$ of a fully-connected feed forward neural network can be conveniently written in matrix notation:

$$\vec{N}_0 = \vec{x}, \tag{9}$$

$$\vec{N}_k = \phi_k(W_k \vec{N}_{k-1}) \forall k \in [1, n), \tag{10}$$

where $W_k$ is a matrix that contains the model parameters $\vec{w}_j$ for each neuron in the layer as rows. The activation function $\phi_k$ operates element wise on its vector input.

The neural network of FIG. 1 may be an example of a multilayer perceptron (MLP). As described above generally for neural networks, the MLP can include an input layer, one or more hidden layers, and an output layer. In some examples, adjacent layers in the MLP can be fully connected to one another. For example, each node in a first layer can be connected to each node in a second layer when the second layer is adjacent to the first layer. The MLP can be a feedforward neural network, meaning that data moves from the input layer to the one or more hidden layers and to the output layer when receiving new data.

The input layer can include one or more input nodes. The one or more input nodes can each receive data from a source that is remote from the MLP. In some examples, each input node of the one or more input nodes can correspond to a value for a feature of a pixel of an image. Exemplary features can include a color value of the pixel, a shading normal of the pixel, position data of the pixel, a depth of the pixel, an albedo of the pixel, a position value of the pixel, a motion vector, an object ID, or the like. In such examples, if an image is 10 pixels by 10 pixels, the MLP can include 100 input nodes multiplied by the number of features. For example, if the features include color values (e.g., red, green, and blue) and shading normals (e.g., x, y, and z), the MLP can include 600 input nodes (10×10×(3+3)).

A first hidden layer of the one or more hidden layers can receive data from the input layer. In particular, each hidden node of the first hidden layer can receive data from each node of the input layer (sometimes referred to as being fully connected). The data from each node of the input layer can be weighted based on a learned weight. In some examples, each hidden layer can be fully connected to another hidden layer, meaning that output data from each hidden node of a hidden layer can be input to each hidden node of a subsequent hidden layer. In such examples, the output data from each hidden node of the hidden layer can be weighted based on a learned weight. In some examples, each learned weight of the MLP can be learned independently, such that a first learned weight is not merely a duplicate of a second learned weight.

A number of nodes in a first hidden layer can be different than a number of nodes in a second hidden layer. A number of nodes in a hidden layer can also be different than a number of nodes in the input layer (e.g., as in the neural network illustrated in FIG. 1).

A final hidden layer of the one or more hidden layers can be fully connected to the output layer. In such examples, the final hidden layer can be the first hidden layer or another hidden layer. The output layer can include one or more output nodes. An output node can perform one or more operations described above (e.g., non-linear operations) on data provided to the output node to produce a result to be provided to a system remote from the MLP.

II. Upscaling Using Neural Networks

Figure 2:
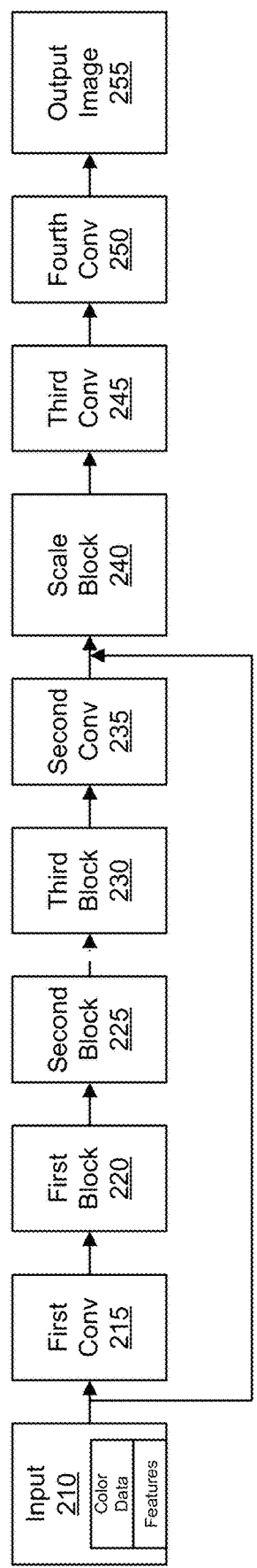
FIG. 2 illustrates an exemplary neural network for scaling a rendered image according to some embodiments of the present invention.

FIG. 2 illustrates an exemplary neural network for scaling a rendered image according to some embodiments of the present invention. The input 210 may comprise color data for input pixels of an input image and an input set of features used to render the input image of a three-dimensional animation environment (e.g., a shading normal of each of the pixels of the input image, position data of pixels of the input image, a depth of each of the pixels of the input image, an albedo of each of the pixels of the input image, a motion vector of each of the pixels of the input image, an object ID of each of the pixels of the input image, etc.). The input pixels and the set of features may both be of a first resolution, or the input pixels and the set of features may be of different resolutions.

In some examples, if the resolution of the input pixels and the features are the same, the color data and the set of features can be first concatenated to form an n-channel image by adding the set of features as additional channels to the color data. For example, if the color data is standard three-channel (R, G, B), the shading normal comprise three values (e.g., x, y, and z), and depth and albedo both comprise one value each (e.g., d for depth, and a for albedo), the n-channel image may be (R, G, B, x, y, z, d, a) with n equal to n=3+3+1+1=8. In other examples, if the resolution of the color data and the set of features do not match, the color data of the input pixels may be scaled to match the resolution of the set of features. For example, after initial processing (e.g., after the input 210 is fed through a first convolutional layer 215 and through to a second convolutional layer 235) the color data may be fed into and scaled by a scale block 240 to match the resolution of the set of features. After the color data is scaled to match the resolution of the set of features the color data may be concatenated with the set of features.

The input 210 may be fed into the first convolutional layer 215. The first convolutional layer 215 may have a size corresponding to the input 210. For example, if the input 210 is simply a color image comprising three-channel color data, and the first convolutional layer 215 has a kernel of size 3×3, the overall size of the kernel may be 3×3×3 (where the last 3 is the number of channels the image has). Otherwise if the input 210 is an n-channel image, the size of the kernel may be 3×3×n. The kernel of the first convolutional layer 215 may be a learnable kernel of appropriate size to the input comprising a plurality of learnable parameters. The kernels of any of the other convolutional layers of the neural network may also be learnable kernels. The output of the first convolutional layer 215 may then be fed into a first block 220. The first block 220 may be a residual block. The neural network of FIG. 2 illustrates the use of three total residual blocks, but a different amount be used. The structure of any of the three residual blocks can be more easily described by FIG. 3.

The output of the second convolutional layer 235 may then be fed into the scale block 240. The scale block 240 may scale the color data of the input 210. For example, the scale block 240 may comprise two sets of upscaling blocks (e.g., an example upscaling block may be formed by a convolutional layer followed by a sub-pixel convolutional layer that upscales the feature maps of the color data, and optionally may include a concatenation layer) that each upscale the color data by a factor of two. In this example, the output of the scale block 240 is then an upscaled image at 4× the resolution of the input image. As previously described, if the resolution of the color data of the input image and the set of features do not match, the scale block 240 may scale the resolution of the color data of the input image to match the resolution of the set of features. Typically, the input color data and set of features are at the same resolution, but in some embodiments the features can be rendered at a higher resolution than the color data.

Once the resolution of the color data matches the resolution of the set of features, the scale block 240, can concatenate the color data and the set of features. The scaled image at the output of the scale block 240 may then be fed into a third convolutional layer 245 (which may have a learnable kernel of size suitable to match the scaled resolution, i.e. —3×3×(4n) in the example that the image was upscaled by a factor of 4), and the output of the third convolutional layer 245 may be fed into a fourth convolutional layer 250. The output 255 of the fourth convolutional layer 250 may be an output image having a second resolution different to the first resolution. The output 255 may comprise an output image at the scaled resolution, and the set of features at their native (unchanged) resolution.

FIG. 3 illustrates exemplary blocks shown in FIG. 2 according to some embodiments of the present invention. The exemplary blocks illustrated by FIG. 3 may increase the performance of training the neural networks of FIG. 2, by slowing the degradation of accuracy as the neural network goes deeper. Any of the blocks may be formed using convolutional layers 302, batch-normalization layers 304, and an activation function ReLU 306. The convolutional layers 302 of the exemplary blocks are separate from the convolutional layers shown in FIG. 2. The residual block 300 may comprise two convolutional layers 302 followed by a batch-normalization layers 304 and use ReLU 306 as the activation function.

The residual block without batch normalization 320 may be similar to the residual block 300 but without the batch-normalization layers 304 included. A dense residual block 340 may begin with and end with convolutional layers 302 and may alternate between convolutional layers 302 and activation functions ReLU 306. The dense residual block 340 may comprise an additional residual scaling factor 308 which can be a learnable constant between 0 and 1. Any of the three residual blocks illustrated by FIG. 3 can be used as any of the blocks shown in FIG. 2 (e.g., the first block 220, the second block 225, the third block 230).

III. Training Data

To train the neural network illustrated by FIG. 2 (e.g., to train the learnable kernels of the convolutional layers so that they can be used to generate higher quality output images), training data is used. As described above, the input to the neural network used to scale images can be color data for input pixels of an input image and an input set of features used to render the input image of a three-dimensional animation environment. Example features include a shading normal, a depth, an albedo, a position value, an object ID, etc. An example of a set of features used to render the input image of the three-dimensional animation environment can include one or more of the described features for each pixel. The set of features for the input image are used to enhance the learning of the cross-resolution mapping.

The output of the neural network is an output image having a second resolution that is different than the first resolution. Accordingly, the training data set requires images of different resolutions. The training data set can comprise a plurality of low-resolution/high-resolution image pairs and the set of features used to render either the low- or high-resolution image. For example, if the neural network is to be trained to downscale the resolution of images, the set of features used to render the high-resolution image can be used.

With a base low-resolution/high-resolution image pair, a number of data augmentations can be applied to the image pair to generate new image pairs to be used in the training. The use of augmented image pairs can allow for efficient generation of training data without additional rendering. The augmentation can also create training image pairs in a particular way that can allow the model to be trained to account for certain conditions. For example, a random color shift can be introduced to the low-resolution/high-resolution image pair to make the neural network more robust to diverse lighting conditions. Other examples of data augmentations can include reflections (e.g., a flip of the image across the y- or x-axis) and rotations (e.g., a rotation generated by applying a rotation matrix to the image) of the low-resolution/high-resolution image pairs.

A. Rendered Image Pairs

One technique to generate the training data set is to separately render a low-resolution image at a first training resolution and a high-resolution image at a second training resolution. A computer running a three-dimensional animation environment may generate a set of features for a low-resolution image and a set of features for a high-resolution image and subsequently use the two sets of features to generate their respective image. This option may be cumbersome due to the cost and time required to generate the image pairs, in particular the high-resolution image, to obtain a large training data set. However, separately rendering the images ensures the quality of the images. Neural networks trained on image pairs generated using bicubic interpolation do not generalize to novel data, meaning no new details are synthesized, because real-world degradation operators are much more complex than bicubic interpolation. Rendering image pairs may also be favorable when training the neural network to learn the high-to-low resolution mapping, as a smaller training data set is used to learn the high-to-low resolution mapping than is used to learn the low-to-high resolution mapping.

B. Scaling Network

An alternative to solely using separately rendered image pairs is to first use some rendered image pairs to learn the opposite resolution mapping (e.g., downscaling) before learning the desired resolution mapping. As mentioned above, the high-to-low resolution mapping typically requires a smaller training data set to learn. Separately rendered image pairs can be used to learn the high-to-low resolution mapping, and then a large number of low-resolution images can be generated from existing high-resolution images using the learned mapping.

For example, a neural network may first learn a high-to-low resolution mapping and then the high-to low resolution mapping can be used to generate a large number of image pairs. The high-to-low resolution mapping can generate low-resolution images by using an existing high-resolution animation (e.g., frames of a 4K resolution animated movie) as input to the neural network. After the low-resolution images are generated, data augmentations can be applied to the low-resolution/high-resolution image pairs to generate further image pairs. For example, a second image pair can be generated by applying a transformation matrix (e.g., reflections, rotations), a color shift (e.g., a shift of the color data of one or more pixels of the image pairs) to a first image pair. In this manner, the rendering costs and time are significantly reduced, as existing high-resolution rendered images can be used to learn the low-to-high resolution mapping.

IV. Scaling Images Using Generative Adversarial Networks

Embodiments can use generative adversarial networks for training a machine-learning image scaler. Generative adversarial networks are generative models that can create new data that closely resembles the training data used to train the network. The generative adversarial network can be used to generate images indistinguishable from ground truth. A generator (e.g., the neural network illustrated in FIG. 2) can be paired with a discriminator, which can learn to distinguish scaled images from rendered images.

A. Generator

A generator can comprise a neural network, such as the neural network illustrated in FIG. 2. The neural network can comprise a set of trainable parameters (e.g., various learnable kernels, residual scaling factors, etc.). The input to the generator can be color data for input pixels of an input image and an input set of features used to render the input image of a three-dimensional animation environment. The input pixels can be of a first resolution. The output of the generator is an output image having a second resolution that is different than the first resolution, thereby upscaling or downscaling. After the generator has been trained, the outputs of the generator may resemble the rendered 3D environment but at the second resolution.

B. Discriminator

A discriminator can comprise a neural network, similar to the generator. The discriminator may receive two types of inputs: rendered images and scaled images. The discriminator may attempt to classify which type the received input image belongs to. The discriminator may have an associated loss function. The loss function may include one or more of a discriminator loss, an L1 or L2 loss, a color shift loss, or a feature loss. The discriminator loss may be used to maximize the probability of assigning the correct type to scaled or rendered images. The L1 loss may penalize the difference between the rendered input image and the scaled image. The color shift loss may penalize the L1 loss between an input low-resolution rendered image, and a downscaled low-resolution image. The downscaled low-resolution image can be generated by upscaling the low-resolution rendered image to create an upscaled high-resolution image, and then downscaling the upscaled high-resolution image. The feature loss may be similar to a visual geometry group (VGG) loss, which penalizes differences between intermediate feature maps of the network between the scaled image and the ground truth (reference) image. The loss function may be used as a quality metric by the discriminator. In some examples, the quality metric may be normalized such that the loss as determined by the loss function of the quality metric is a number between 0 and 1.

Figure 4:
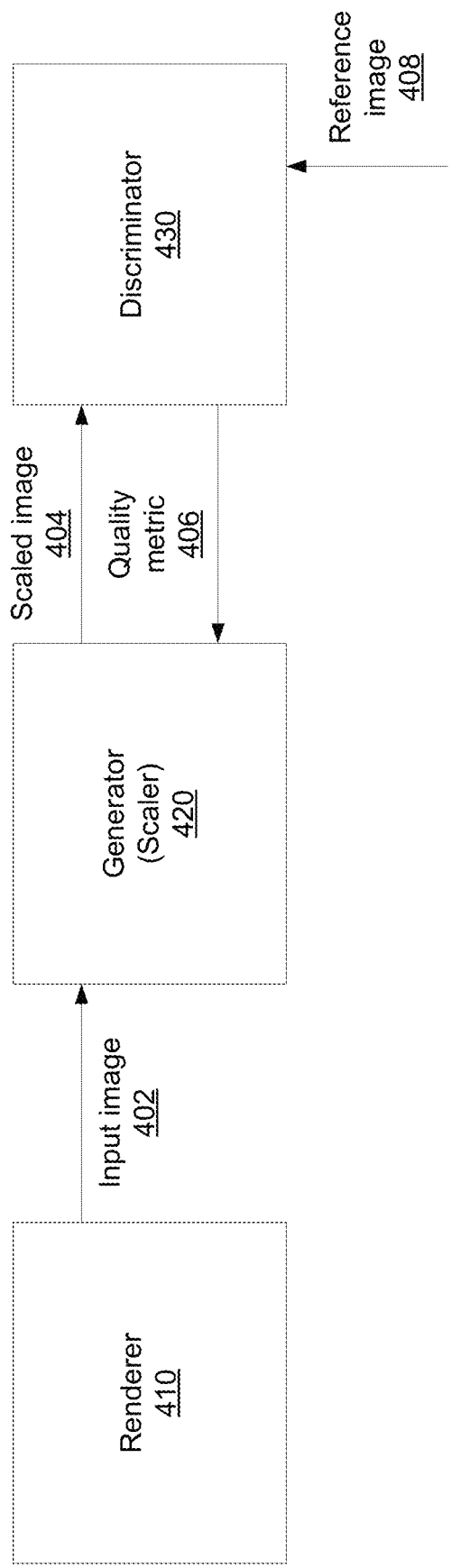
FIG. 4 illustrates a system for scaling images based on generative adversarial networks according to some embodiments of the present invention.

FIG. 4 illustrates a system for scaling images based on generative adversarial networks according to some embodiments of the present invention. An input image 402 (e.g., a low-resolution rendered image) and an input set of features used by a renderer 410 to generate the rendered image may be input into a generator 420. The input image 402 may form an image pair with a reference image 408 (e.g., a high-resolution rendered image of the same 3D scene). The generator 420 may include a neural network (e.g., the neural network used to scale images illustrated in FIG. 2) configured to generate a scaled image 404 at a second resolution different than the resolution of the input image 402. The input image 402 may comprise high dynamic range data, which is typically represented with floating point intensities exceeding 1. As neural networks perform best with input data normalized between (−1,1) or (0,1), the following range compression function can be applied to accommodate high dynamic range data: $T_y = \kappa \log(1+\mu y)/\log(1+\mu)$. For example, by setting $\kappa=0.6$ and $\mu=5000$, luminance values near 300 can be provided.

The scaled image 404 from the generator 420 may be given as input to the discriminator 430, and the discriminator 430 also receives the reference image 408. Both the scaled image 404 and the reference image 408 may be labeled explicitly as scaled or rendered images (e.g., a binary value may be included with the image such that a "1" may indicate to the discriminator 430 that the image is a rendered image, and a "0" may indicate that the image is a generated image). The generator 420 may be trained to produce the output image such that is resembles the reference image 408. The discriminator 430 may be configured to output a quality metric 406 which is input to the generator 420. The quality metric 406 may include a loss function comprising one or more of a discriminator loss, an L1 or L2 loss, a color shift loss, or a feature loss. The quality metric 406 can be calculated using the color data of the output image 404 and the reference image 408. For example, an L1 loss between the output image 404 and the reference image 408 can be calculated to determine a level of similarity (or difference) of the two images.

C. Training

The generator 420 and the discriminator 430 may be trained jointly, e.g., holding generator 420 fixed and training discriminator 430 for some training data, and then training generator 420 while holding discriminator 430 fixed. Each of them may have their own optimization target, which can follow any common generative adversarial network objectives. In some examples, each of the generator 420 and the discriminator 430 may be optimized using a stochastic gradient descent training procedure.

FIGS. 5A and 5B illustrate a system for training a scaler based on generative adversarial networks according to some embodiments of the present invention.

The generator 420 and the discriminator 430 may be trained in an alternating fashion. The parameters of the discriminator 430 (i.e., the weights for the nodes in the discriminator network) may be fixed while the generator 420 is being trained, as illustrated in FIG. 5A. Similarly, the parameters of the generator 420 (i.e., the weights for the nodes in the generator network) may be fixed while the discriminator 430 is being trained, as illustrated in FIG. 5B. For the first few iterations, both the discriminator 430 and the generator 420 may be poor-performing networks, as they may be initialized with "random" weights. In a first iteration, the generator 420 may be trained against the poor discriminator 430. The now slightly less poor generator 420 may be then fixed and the discriminator 430 may be trained against it. In a next iteration, the discriminator 430 may be fixed, and the generator 420 may be trained against the slightly better discriminator 430.

This back-and-forth process may be repeated many times, with the generator 420 and the discriminator 430 improving incrementally in each iteration. As the training converges, the generator 420 may have learned to produce an output image that looks very "real" and the quality metric (e.g., a loss function) output by the discriminator 430 is generally reduced from iteration to another.

In some embodiments, the training may alternate between the generator 420 and the discriminator 430 with varying update steps for each of the generator 420 and the discriminator to balance the convergence speed. For example, the training may alternate between the generator 420 and the discriminator 430 for every update step; that is, one update step for the generator 420 and one update step for the discriminator 430. As another example, the training may alternate between the generator 420 and the discriminator 430 for every three update steps for the generator 420 and every update step for the discriminator 430. As a further example, the training may alternate between the generator 420 and the discriminator 430 for every three update steps for the generator 420 and every three update steps for the discriminator 430.

In some embodiments, the generator 420 may also use other loss functions in conjunction the discriminator 430 during training. For example, the generator 420 may also use L1, L2 (i.e., mean square error or MSE), relative MSE (MrSE), peak signal-to-noise ratio (PSNR), mean absolute percentage error (MAPE), structural similarity index (SSIM), multiscale SSIM, or a combination thereof, for its training, where such errors may be determined using the high-resolution image corresponding to the low-resolution input image. In some embodiments, the various loss functions and the discriminator may be combined with relative weights.

Training of GANs can be notoriously unstable. For example, poor initialization of the generator 420 and the discriminator 430, or unbalanced optimization steps can result in divergence of either network. When both the generator 420 and the discriminator 430 perform poorly, they may not be able to learn much from each other. In some cases, the generator 420 or the discriminator 430 may reach a local minimum of their loss function, where loss gradients vanish causing the optimization to be stuck. To improve the stability of the training, the generator 420 and the discriminator 430 may be "pre-trained" independently for a number of iterations before being trained jointly. For example, the generator 420 may be pre-trained with a traditional loss function to make the generator 420 somewhat "sensible." Similarly, the discriminator 430 may be pre-trained until it starts to be able to distinguish between scaled images from rendered images. Then the parameters of the generator 420 and the discriminator 430 (e.g., the first set of parameters and the second set of parameters) may be optimized jointly in turns as described above.

In some further embodiments, the generator 420 and the discriminator 430 may be trained jointly and simultaneously as one system.

1. Training the Downscaling Network

To begin training, it can be efficient to begin with a first training data set of image pairs generated by separately rendering images at a first training resolution and at a second training resolution. For example, the separately rendered images may be low-resolution images rendered at a first training resolution and high-resolution images rendered at a second training resolution. As described above, the set of parameters of the discriminator 430 or the generator 420 may be fixed, while the set of parameters of the other are updated. The goal is for the generator to learn the high-to-low resolution mapping, so that existing high-resolution images can be used to generate a large dataset to learn the low-to-high resolution mapping. The size of the training data set used to learn the high-to-low resolution mapping (i.e., train the downscaling network) is typically smaller than the size of the training data set used to learn the low-to-high resolution mapping. To improve efficiency (e.g., reducing rendering costs and time), the high-to-low resolution mapping is learned first.

The renderer 410 can input color data for input pixels of a ground truth high-resolution image and an input set of features used to render the high-resolution image to the generator 420. Before inputting the image into the generator 420, data augmentations (e.g., color shifts, reflections, rotations, etc.) may be applied to the high-resolution image and a correspondence reference image. For example, if data augmentations are to be included, a rotation matrix can be generated by a computer operating the downsampling network. The rotation matrix can then be applied to the high-resolution image such that the high-resolution image is rotated by 90 degrees clock-wise. After receiving the high-resolution image, the generator 420 may generate a low-resolution image and pass it to the discriminator 430.

The discriminator 430 may additionally receive the ground truth low-resolution image to use as a reference image. In some examples, the discriminator 430 may output a quality metric to the generator 420. The quality metric can be based on a comparison of the output image with the reference image. For example, the quality metric can include a loss function that compares the output image with the reference image. The generator 420 may, in response to receiving the quality metric, update a first set of parameters associated with the generator 420, and may further generate an updated output image using the updated first set of parameters.

As described above, this process can be repeated to further train the generator 420 and discriminator 430. After the generator 420 and the discriminator 430 are sufficiently trained (e.g., the loss as determined by the loss function of the quality metric for any image pair used as input heads to a zero), the generator 420 can be said to be trained. The generator 420 can subsequently receive high-resolution images and use the learned high-to-low resolution mapping to generate low-resolution images corresponding to the high-resolution images. Existing high-resolution images can be taken from frames of animated films, prior high-resolution renders, etc., to generate a second training data set using the generator. For example, the second training data set can comprise rendered high-resolution images and the set of features used to render the high-resolution images, and a downscaled images that were downscaled using the generator.

2. Training the Upscaling Network

After the generator 420 generates a sufficiently large second training data set, the first generative adversarial network can be used to learn the low-to-high resolution mapping (i.e., train the downscaling network) via a second generative adversarial network. The second generative adversarial network can comprise the same or different components to the first generative adversarial network as shown in FIG. 4. The second generative adversarial network can be trained using the second training data set, including training image pairs generated by the first generative adversarial network. The second training data set can include color data of second training input images (e.g., low resolution images generated by the first generative adversarial network) and second training output images (e.g., the high resolution rendered images used by the first generative adversarial network to generate the previously mentioned low resolution image) and a second training set of the features used to render the second training output images. Image pairs from the first training set can also be used.

The process to train the upscaling network can follow the same logic as training the downscaling network described by FIGS. 5A and 5B; however, the input image is a ground truth low-resolution image, and the reference image is a ground-truth high-resolution image. As the architecture of the first generative adversarial network and the second generative adversarial network are the same or similar, a similar numbering will be used for their components in the following description. The equivalent of the generator 420 in the second generative adversarial network can receive the ground-truth low-resolution image and generate an output image that is a high-resolution scaled image. The output image is input from the generator 420 to the discriminator 430 which outputs a quality metric to the generator 420 based on a comparison of the output image with the reference image using a second set of parameters associated with the discriminator 430. The generator 420 may, in response to receiving the quality metric, update a first set of parameters associated with the generator 420, and may further generate an updated output image using the updated first set of parameters.

As described above, this process can be repeated to further train the generator 420 and discriminator 430. After the generator 420 and the discriminator 430 are sufficiently trained the generator 420 can subsequently receive low-resolution images and use the learned low-to-high resolution mapping to generate high-resolution images corresponding to the low-resolution images.

D. Scaling Image Resolution

In some embodiments, only one generative adversarial network is used. In other embodiments, two generative adversarial networks are used: one to generate training images and the other to perform the desired resolution scaling. A generative adversarial network can be trained to learn a high-to-low resolution and/or a low-to-high resolution mapping. Both the high-to-low resolution mapping and the low-to-high resolution mapping can be learned using a training method as described by FIG. 6. The learned resolution mapping can then be used to scale the resolution of images as described by FIG. 7.

1. Method for Training a Generative Adversarial Network

FIG. 6 is a flowchart illustrating a method of training a generative adversarial network according to some embodiments of the present invention. The method described by FIG. 6 can be performed by a computer, such as the computers described in the example systems section. A training data set comprising a plurality of training image pairs may be used to train the generative adversarial network.

At step 602, the computer may receive color data for input pixels of an input image and an input set of features used to render the input image of a three-dimensional animation environment, and a reference image. The input pixels are of a first resolution. The input image and the reference image may be images that form a training image pair in the training data set. For example, the input image may be a high-resolution rendered image, and the reference image may be a low-resolution rendered image. In another example, the input image may be a low-resolution rendered image, and the reference image may be a high-resolution rendered image.

At step 604, the computer may configure a generative adversarial network. As an example of configuring the generative adversarial network, the computer can read a configuration file that defines the architecture of the generative adversarial network. The file may contain information such as the number of nodes, the type of residual block used in the first neural network, the size of the kernels of the convolutional layers, etc. The computer can then generate a neural network having the properties corresponding to the configuration file, e.g., by creating the software objects (such as nodes) and creating connections between certain nodes. For example, the computer may configure the generative adversarial network to include a generator comprising a first neural network having a first set of parameters, such as the neural network illustrated by FIG. 2. The generator may be configured to generate an output image, having a second resolution that is different to the first resolution, using the first set of parameters. For example, if the input image is a high-resolution rendered image, the generator may generate a low-resolution output image using the input image and the input set of features used to render the input image. In another example, if the input image is a low-resolution rendered image, the generator may generate a low-resolution output image using the input image and the input set of features used to render the input image. In some examples, the generator may apply data augmentations to the input image before generating the output image.

The generative adversarial network may further comprise a discriminator comprising a second neural network having a second set of parameters, coupled to the generator. The discriminator may be configured to receive the reference image and the output image generated by the generator. After receiving the two images, the discriminator may generate a quality metric based on a comparison of the output image with the reference image. For example, the discriminator may calculate a loss using a loss function comprising one or more of a discriminator loss, an L1 or L2 loss, a color shift loss, or a feature loss. The quality metric can be output to the generator. The generator can update the first set of parameters based on the quality metric and produce an updated output image using the updated first set of parameters.

At step 606, the computer may train the configured generative adversarial network to obtain an optimized first set of parameters and an optimized second set of parameters. In some examples, the computer may train the configured generative adversarial network for a fixed number of steps. In other examples, the computer may train the configured generative adversarial network until a convergence criterion is reached. The convergence criterion may be based on the value of the quality metric, or a value associated with the quality metric such as a derivative. In some examples, the generator and the discriminator may be jointly trained. For example, the first set of parameters may be updated while the second set of parameters are held fixed, or vice versa.

The above method can be used to train a network to learn both a high-to-low resolution mapping and a low-to-high resolution mapping. For example, a first generative adversarial network can use the method of FIG. 6 to learn the high-to-low resolution mapping by using a first training data set that contains data of rendered low- and high-resolution image pairs. The learned high-to-low resolution mapping can be used to generate a second training data set, by applying the high-to-low resolution mapping to (potentially pre-existing) high resolution images to generate image pairs. The second training data set can then be used by a second generative adversarial network to learn the low-to-high resolution mapping. The number of image pairs in the second training data set can be larger than the number of image pairs in the first training data set, as there is no need to render high-resolution images which is costly.

2. Method for Scaling Images

Figure 7:
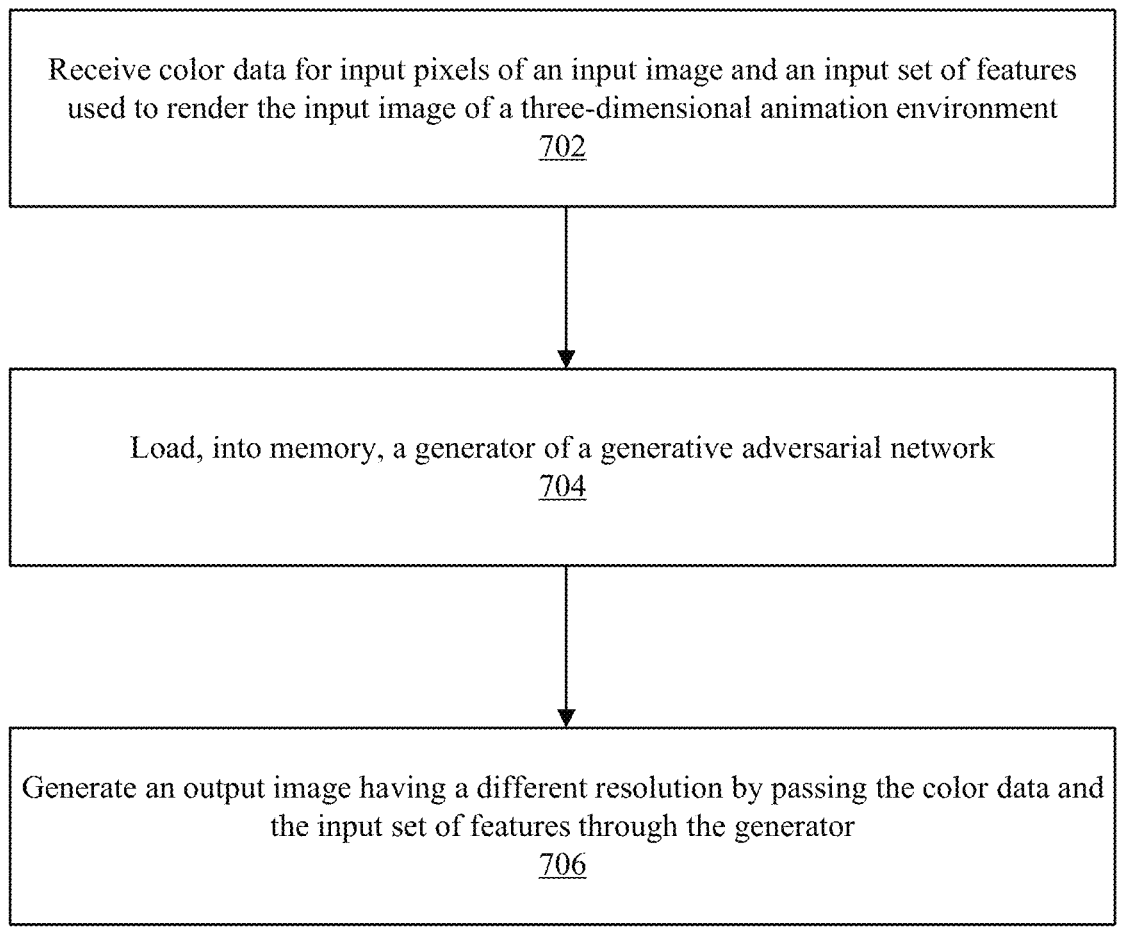
FIG. 7 is a flowchart illustrating a method of scaling images using a generative adversarial network according to some embodiments of the present invention.

FIG. 7 is a flowchart illustrating a method of scaling images using a generative adversarial network according to some embodiments of the present invention. The method described by FIG. 7 can be performed by a computer, such as the computers described in the example systems section. The method can be used to generate low-resolution images from a high-resolution image, or vice-versa.

At step 702, the computer may receive color data for input pixels of an input image and an input set of features used to render the input image of a three-dimensional animation environment, wherein the input pixels are of a first resolution. For example, the computer may receive color data for input pixels of a relatively low-resolution input image, and the set of features used to render the relatively low-resolution input image. In another example, the computer may receive color data for input pixels of a relatively high-resolution input image, and the set of features used to render the relatively high-resolution input image. The set of features of the input image may comprise one or more of a position data, shading normal, a depth, an albedo, an object ID or the like.

At step 704, the computer may load into memory a generator of a generative adversarial network. The generator may comprise a neural network used to scale the input image. The generator may have been trained using training data comprising color data of training input images and training output images and a training set of the features used to render the training input images. For example, if the computer receives color data for a relatively low-resolution input image, the training input images may also be relatively low-resolution input images and the training output images may be relatively high-resolution output images. In another example, if the computer receives color data for a relatively high-resolution input image, the training input images may also be relatively high-resolution input images and the training output images may be relatively low-resolution output images. The generator may have been trained in conjunction with a discriminator, such as the discriminator described with reference to FIGS. 4, 5A, and 5B.

At step 706, the computer may generate an output image having a second resolution that is different than the first resolution by passing the color data and the input set of features through the generator. For example, the input image and the input set of features may be given as input into the generator (e.g., as described in FIG. 2). The generator may comprise a neural network. The neural network may comprise a plurality of convolution layers, blocks (e.g., different types of residual blocks), scale blocks, etc. The convolution layers of the neural network may be of appropriate size, corresponding to the size of the input. For example, if the color data of the input image comprises three channel data, and the set of features used to render the input image comprise albedo and depth, the convolution layers of the neural network may have a depth of n=3+1+1=5.

The neural network may have a first set of parameters associated with the generator. For example, the first set of parameters may correspond to a learnable kernel of convolutional layers. After passing through a set of residual blocks and further convolutions, a scale block may scale the input image. For example, if the input image is a relatively high-resolution image, the scale block may downscale the input image to a low-resolution output image. In another example, if the input image is a relatively low-resolution image, the scale block may upscale the input image to a high-resolution output image. The output image may be of a second resolution that is different than the first resolution.

V. Example Images

FIG. 8 depicts images generated using a generative adversarial network according to some embodiments of the present invention. The original low-resolution image 800 is upscaled using TVIScale to form image 810. The image 800 is also upscaled using the methods described by FIGS. 6 and 7 to form image 820. Image 820 has sharper edges along the edges of the letters as compared to the image 810.

FIG. 9 depicts other images generated using a generative adversarial network according to some embodiments of the present invention. The original low-resolution image 900 is upscaled using TVIScale to form image 910. The image 900 is also upscaled using the methods described by FIGS. 6 and 7 to form image 920. As compared to image 910, image 920 has greater detail in the button, and on the fabric surrounding the button. Additionally, image 920 produces sharper lines on the fabric.

Figure 10:
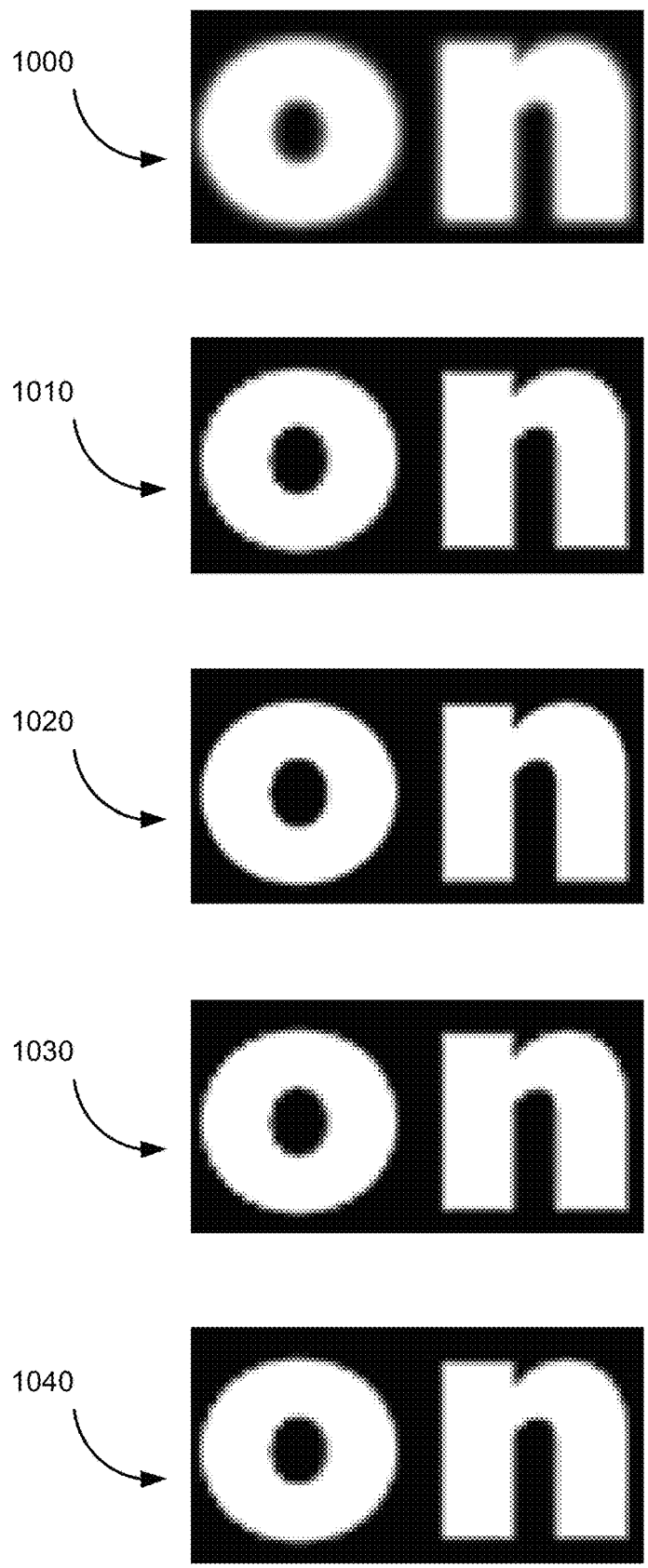
FIG. 10 depicts images generated using a generative adversarial network trained using training data generated using downsampling according to some embodiments of the present invention.

FIG. 10 depicts images generated using a generative adversarial network trained using training data generated using downsampling according to some embodiments of the present invention. The original low-resolution image 1000 is upscaled using methods described by FIGS. 6 and 7 to form image 1010 and image 1020. Image 1010 is formed using a generative adversarial network trained using 3500 rendered image pairs. Image 1020 is formed using a generative adversarial network trained using 25,000 synthetic image pairs (e.g., image pairs formed using downscaling of high-resolution images). Image 1030 is formed using a sharp blind network, which displays some edge artifacts on the text. Image 1040 is formed using a soft blind network, which has reduced edge artifacts (although they still appear on the text) compared to the sharp blind network but sacrifices sharpness.

VI. Example Systems

Figure 11:
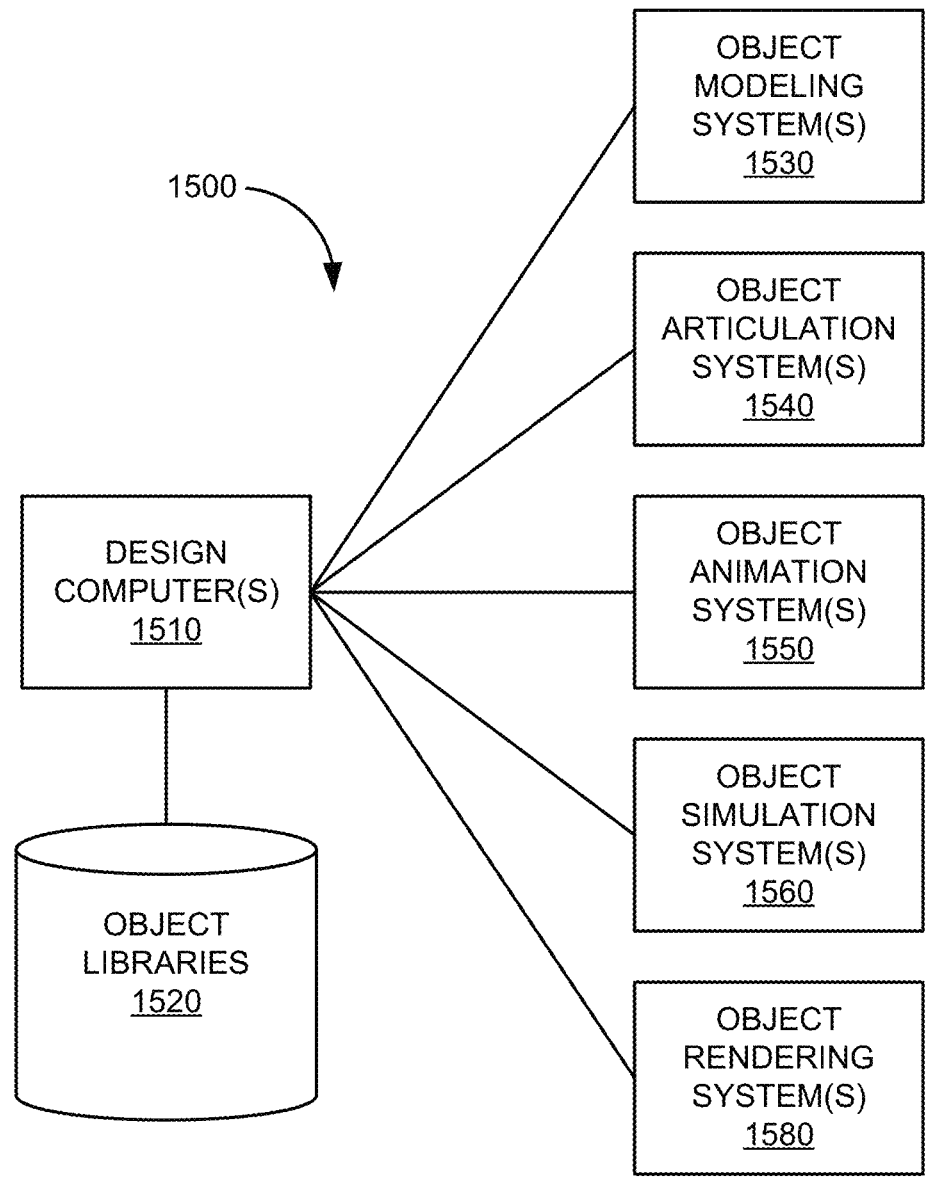
FIG. 11 is a simplified block diagram of a system for creating computer graphics imagery (CGI) and computer-aided animation that may implement or incorporate various embodiments of the present invention.

FIG. 11 is a simplified block diagram of system 1500 for creating computer graphics imagery (CGI) and computer-aided animation that may implement or incorporate various embodiments. In this example, system 1500 can include one or more design computers 1510, object library 1520, one or more object modeling systems 1530, one or more object articulation systems 1540, one or more object animation systems 1550, one or more object simulation systems 1560, and one or more object rendering systems 1570. Any of the systems 1530-1570 may be invoked by or used directly by a user of the one or more design computers 1510 and/or automatically invoked by or used by one or more processes associated with the one or more design computers 1510. Any of the elements of system 1500 can include hardware and/or software elements configured for specific functions.

The one or more design computers 1510 can include hardware and software elements configured for designing CGI and assisting with computer-aided animation. Each of the one or more design computers 1510 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1510 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1510 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1510 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1510 acting as an animator may employ one or more systems or tools to specify motion and position of one or more objects over time to produce an animation.

Object library 1520 can include elements configured for storing and accessing information related to objects used by the one or more design computers 1510 during the various stages of a production process to produce CGI and animation. Some examples of object library 1520 can include a file, a database, or other storage devices and mechanisms. Object library 1520 may be locally accessible to the one or more design computers 1510 or hosted by one or more external computer systems.

Some examples of information stored in object library 1520 can include an object itself, metadata, object geometry, object topology, rigging, control data, animation data, animation cues, simulation data, texture data, lighting data, shader code, or the like. An object stored in object library 1520 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1530 can include hardware and/or software elements configured for modeling one or more objects. Modeling can include the creating, sculpting, and editing of an object. In various embodiments, the one or more object modeling systems 1530 may be configured to generated a model to include a description of the shape of an object. The one or more object modeling systems 1530 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1530 may further generate model data (e.g., 2D and 3D model data) for use by other elements of system 1500 or that can be stored in object library 1520. The one or more object modeling systems 1530 may be configured to allow a user to associate additional information, metadata, color, lighting, rigging, controls, or the like, with all or a portion of the generated model data.

The one or more object articulation systems 1540 can include hardware and/or software elements configured to articulating one or more computer-generated objects. Articulation can include the building or creation of rigs, the rigging of an object, and the editing of rigging. In various embodiments, the one or more articulation systems 1540 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1540 may further generate articulation data (e.g., data associated with controls or animations variables) for use by other elements of system 1500 or that can be stored in object library 1520. The one or more object articulation systems 1540 may be configured to allow a user to associate additional information, metadata, color, lighting, rigging, controls, or the like, with all or a portion of the generated articulation data.

The one or more object animation systems 1550 can include hardware and/or software elements configured for animating one or more computer-generated objects. Animation can include the specification of motion and position of an object over time. The one or more object animation systems 1550 may be invoked by or used directly by a user of the one or more design computers 1510 and/or automatically invoked by or used by one or more processes associated with the one or more design computers 1510.

In various embodiments, the one or more animation systems 1550 may be configured to enable users to manipulate controls or animation variables or utilized character rigging to specify one or more key frames of animation sequence. The one or more animation systems 1550 generate intermediary frames based on the one or more key frames. In some embodiments, the one or more animation systems 1550 may be configured to enable users to specify animation cues, paths, or the like according to one or more predefined sequences. The one or more animation systems 1550 generate frames of the animation based on the animation cues or paths. In further embodiments, the one or more animation systems 1550 may be configured to enable users to define animations using one or more animation languages, morphs, deformations, or the like.

The one or more object animations systems 1550 may further generate animation data (e.g., inputs associated with controls or animations variables) for use by other elements of system 1500 or that can be stored in object library 1520. The one or more object animations systems 1550 may be configured to allow a user to associate additional information, metadata, color, lighting, rigging, controls, or the like, with all or a portion of the generated animation data.

The one or more object simulation systems 1560 can include hardware and/or software elements configured for simulating one or more computer-generated objects. Simulation can include determining motion and position of an object over time in response to one or more simulated forces or conditions. The one or more object simulation systems 1560 may be invoked by or used directly by a user of the one or more design computers 1510 and/or automatically invoked by or used by one or more processes associated with the one or more design computers 1510.

In various embodiments, the one or more object simulation systems 1560 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1560 may be used to simulate the behavior of objects, such as hair, fur, and cloth, in response to a physics model and/or animation of one or more characters and objects within a computer-generated scene.

The one or more object simulation systems 1560 may further generate simulation data (e.g., motion and position of an object over time) for use by other elements of system 1500 or that can be stored in object library 1520. The generated simulation data may be combined with or used in addition to animation data generated by the one or more object animation systems 1550. The one or more object simulation systems 1560 may be configured to allow a user to associate additional information, metadata, color, lighting, rigging, controls, or the like, with all or a portion of the generated simulation data.

The one or more object rendering systems 1570 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1570 may be invoked by or used directly by a user of the one or more design computers 1510 and/or automatically invoked by or used by one or more processes associated with the one or more design computers 1510. One example of a software program embodied as the one or more object rendering systems 1570 can include PhotoRealistic RenderMan, or PRMan, produced by Pixar Animations Studios of Emeryville, California.

In various embodiments, the one or more object rendering systems 1570 can be configured to render one or more objects to produce one or more computer-generated images or a set of images over time that provide an animation. The one or more object rendering systems 1570 may generate digital images or raster graphics images.

In various embodiments, a rendered image can be understood in terms of a number of visible features. Some examples of visible features that may be considered by the one or more object rendering systems 1570 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1570 may further render images (e.g., motion and position of an object over time) for use by other elements of system 1500 or that can be stored in object library 1520. The one or more object rendering systems 1570 may be configured to allow a user to associate additional information or metadata with all or a portion of the rendered image.

Figure 12:
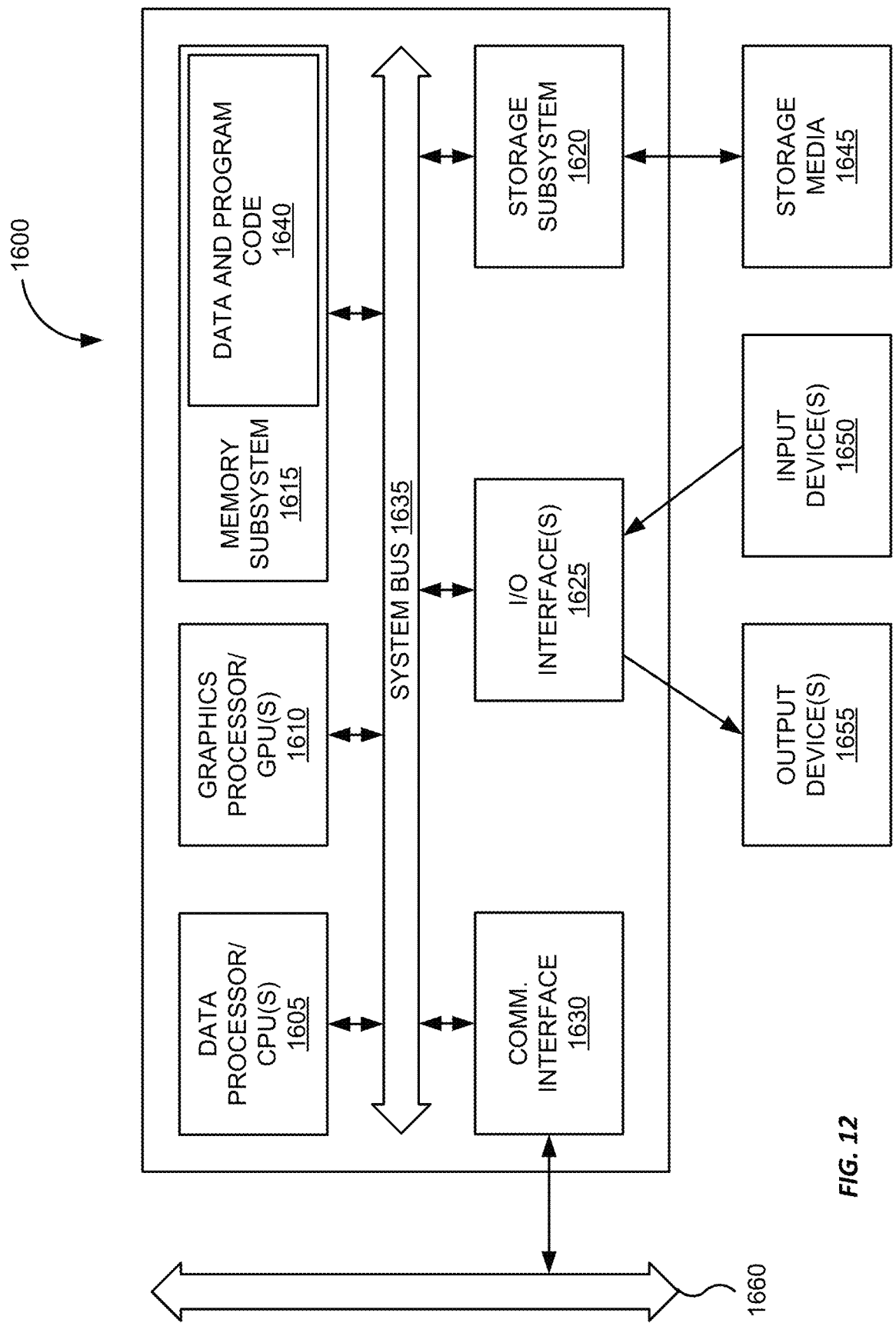
FIG. 12 is a block diagram of a computer system or information processing device that may incorporate an embodiment, be incorporated into an embodiment, or be used to practice any of the innovations, embodiments, and/or examples found within this disclosure.

FIG. 12 is a block diagram of computer system 1600. FIG. 12 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1600 and any of its components or subsystems can include hardware and/or software elements configured for performing methods described herein.

Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication The one or more data processors or central processing units (CPUs) 1605 can execute logic or program code or for providing application-specific functionality. Some examples of CPU(s) 1605 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1610 can execute logic or program code associated with graphics or for providing graphics-specific functionality. GPUs 1610 may include any conventional graphics processing unit, such as those provided by conventional video cards. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like.

Memory subsystem 1615 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1615 can include data and program code 1640.

Storage subsystem 1620 can also store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of data and program code 1640 may be stored using storage subsystem 1620.

The one or more input/output (I/O) interfaces 1625 can perform I/O operations. One or more input devices 1650 and/or one or more output devices 1655 may be communicatively coupled to the one or more I/O interfaces 1625. The one or more input devices 1650 can receive information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can output information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements. A display device or monitor may be used with computer system 1600 and can include hardware and/or software elements configured for displaying information.

Communications interface 1630 can perform communications operations, including sending and receiving data. Some examples of communications interface 1630 may include a network communications interface (e.g. Ethernet, Wi-Fi, etc.). For example, communications interface 1630 may be coupled to communications network/external bus 1660, such as a computer network, a USB hub, or the like. A computer system can include a plurality of the same components or subsystems, e.g., connected together by communications interface 1630 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1600 may also include one or more applications (e.g., software components or functions) to be executed by a processor to execute, perform, or otherwise implement techniques disclosed herein. These applications may be embodied as data and program code 1640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1615 and/or storage subsystem 1620.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method performed by a computer, the method comprising:
receiving color data for input pixels of an input image and an input set of features used to render the input image of a three-dimensional animation environment, wherein the input pixels are of a first resolution;
loading, into memory of the computer, a generator of a generative adversarial network, wherein the generator comprises a neural network used to scale the input image, wherein the generator was trained using training data comprising color data of training input images and training output images and a training set of features used to render the training input images; and
generating an output image having a second resolution that is different than the first resolution by passing the color data and the input set of features through the generator,
wherein the training input images are low-resolution images generated by a second generator of a second generative adversarial network, wherein the training output images are high-resolution rendered images, and wherein the second generator of the second generative adversarial network was trained using second training data comprising second training input images and second training output images and a second set of the features used to render the training output images.

2. The method of claim 1, wherein the input set of features includes one or more of: position data, depth, albedo, motion vector, or object ID.

3. The method of claim 1, wherein the input image is a low-resolution image, and wherein the output image is an upscaled image.

4. The method of claim 1, wherein the input image is a high-resolution image, and wherein the output image is a downscaled image.

5. The method of claim 1, wherein the training input images and the training output images are rendered images, wherein the training input images are rendered at a first training resolution and the training output images are rendered at a second training resolution different from the first training resolution.

6. The method of claim 1, wherein only one of the training input images or the training output images are rendered images, and wherein the other is a scaled image generated by the generator.

7. The method of claim 1, wherein the generator is coupled to a discriminator, and wherein the discriminator is jointly trained with the generator using the training output image and an output image generated by the generator using the training input image.

8. The method of claim 1, wherein the input image comprises high dynamic range data, and the method further comprises applying a range compression function to the high dynamic range data.

9. A computer comprising:
a processor; and
a non-transitory computer readable medium comprising instructions executable by the processor to perform operations including:
receiving color data for input pixels of an input image and an input set of features used to render the input image of a three-dimensional animation environment, wherein the input pixels are of a first resolution;
loading into memory of a generator of a generative adversarial network, wherein the generator comprises a neural network used to scale the input image, wherein the generator was trained using training data comprising color data of training input images and training output images and a training set of the features used to render the training input images, wherein the neural network comprises a plurality of residual blocks and a scale block used to scale the input image to form the output image, and wherein the residual blocks are one of a residual block, a residual block without batch normalization, or a dense residual block; and
generating an output image having a second resolution that is different than the first resolution by passing the color data and the input set of features through the generator.

10. A method performed by a computer, the method comprising:
receiving color data for input pixels of an input image and an input set of features used to render the input image of a three-dimensional animation environment, and a reference image, wherein the input pixels are of a first resolution;
configuring a generative adversarial network comprising:
a generator comprising a first neural network having a first set of parameters, the generator configured to
generate, using the color data and the input set of features, an output image having a second resolution that is different from the first resolution; and
a discriminator coupled to the generator, the discriminator comprising a second neural network having a second set of parameters, the discriminator configured to:
receive the reference image, and the output image generated by the generator;
generate a quality metric based on a comparison of the output image with the reference image; and
output the quality metric to the generator, wherein the generator is further configured to update the first set of parameters based on the quality metric and to produce an updated output image using the updated first set of parameters; and
training the generative adversarial network to obtain an optimized first set of parameters and an optimized second set of parameters that reduce the quality metric generated by the discriminator.

11. The method of claim 10, wherein training the generative adversarial network comprises:
fixing the second set of parameters of the second neural network;
generating, by the generator, a first output image corresponding to a first input image using the first set of parameters;
receiving, by the discriminator, a first reference image corresponding to the first input image, and the first output image generated by the generator;
generating, by the discriminator, the quality metric based on the comparison of the first output image with the first reference image;
outputting the quality metric from the discriminator to the generator, wherein the generator updates the first set of parameters based on the quality metric;
fixing the first set of parameters of the first neural network;
receiving, by the generator, a second input image and a corresponding second reference image;
generating, by the generator, a second output image corresponding to the second input image by passing the second input image through the generator using the optimized first set of parameters;
receiving, by the discriminator, the second reference image, and the second output image;
generating a quality metric based on a comparison of the second output image with the second reference image; and
updating the second set of parameters based on the quality metric.

12. The method of claim 11, wherein the generator is further configured to apply one or more data augmentations to the input image before producing first output image.

13. The method of claim 12, wherein the data augmentations comprise one or more of: a random color shift, a rotation, or a random flip.

14. The method of claim 10, wherein an n-channel image is created by concatenating the color data of the input image with set of input features of the input image as additional channels and wherein the n-channel image is used as the input image.

15. The method of claim 14, wherein the resolution of the color data and the input set of features do not match, and wherein the computer generates the n-channel image after scaling the resolution of the input image to match the resolution of the input set of features.

16. The method of claim 14, wherein the quality metric comprises a loss function for determining accuracy including one or more of: an L1 or L2 loss, a color shift loss, a discriminator loss, or a feature loss.

* * * * *